O. E. BUCKLEY.
METHOD AND APPARATUS FOR MEASURING GAS PRESSURES.
APPLICATION FILED NOV. 27, 1916.
1,372,798.
Patented Mar. 29, 1921.
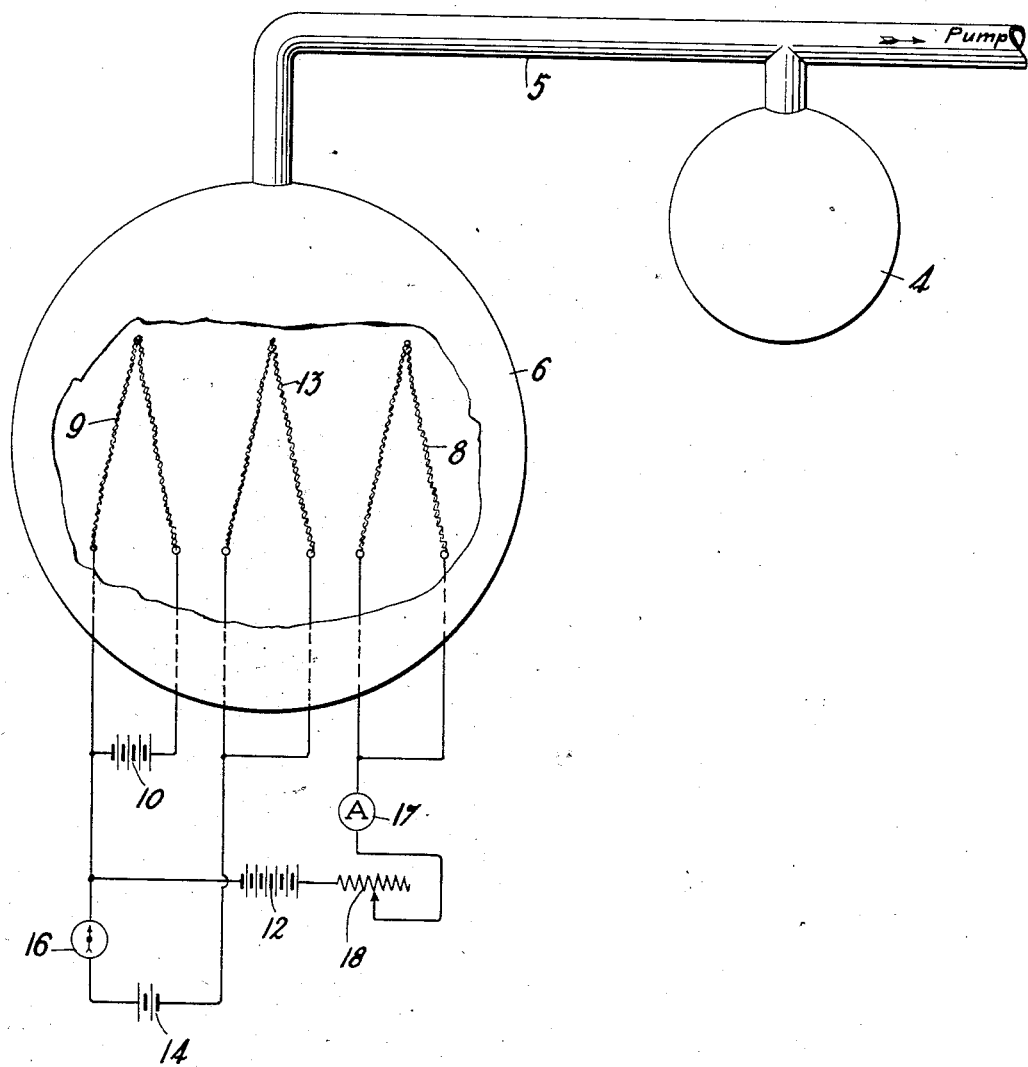
Inventor:
Oliver E. Buckley.

UNITED STATES PATENT OFFICE.

OLIVER E. BUCKLEY, OF EAST ORANGE, NEW JERSEY, ASSIGNOR TO WESTERN ELECTRIC COMPANY, INCORPORATED, OF NEW YORK, N. Y., A CORPORATION OF NEW YORK.

METHOD AND APPARATUS FOR MEASURING GAS-PRESSURES.

1,372,798. Specification of Letters Patent. Patented Mar. 29, 1921.

Application filed November 27, 1916. Serial No. 133,609.

*To all whom it may concern:*

Be it known that I, OLIVER E. BUCKLEY, a citizen of the United States, residing at East Orange, in the county of Essex and State of New Jersey, have invented certain new and useful Improvements in Methods and Apparatus for Measuring Gas-Pressures, of which the following is a full, clear, concise, and exact description.

This invention relates to a method and apparatus for measuring gas pressures, and in particular for measuring exceedingly minute pressures, such as are present in vacuum tubes used for electrical discharges of various characters.

The ordinary mercury manometer can be used directly for the measurement of pressures as low as one tenth of a millimeter of mercury, and in the form of the so-called McLeod gage, may be used for considerably smaller pressures. They have been used to measure, or indicate, pressures as low as $10^{-6}$ millimeters, that is, one millionth of a millimeter, but even before this region is reached they lose enormously in accuracy, due to the occlusion or condensation, of gases, or both on the walls of the containing vessels and attached apparatus. In the case of the measurement of pressures of vapors, such as mercury vapor, they fail entirely.

In this invention is disclosed a method which is independent of such effects as occlusion, or condensation, in that measurements are not made of the pressure directly, but rather of the number of molecules present in a given volume from which the pressure may then be calculated.

The invention depends on the fact that if two electrodes are placed in a perfect vacuum, one of these being capable of acting as an electron source, and being brought to a potential lower than the other, then a pure electron current will flow from the cathode or electron source to the anode, commonly called the plate. If, now, a third cold electrode is placed adjacent to, and is maintained at a lower potential than either of said two electrodes, there can be no current flowing to or from this third electrode, for the negative electrons coming from the electron source can travel only to an electrode of higher potential. If, however, a small amount of gas is present in the space surrounding the electrodes, and a fairly high potential difference is applied between the first two electrodes, the electrons passing to the anode will acquire sufficient velocity to ionize some of the molecules, giving thereby positive and negative ions. The positive ions will travel to negatively charged electrodes, and chiefly to that one which is at the lowest potential, that is, to the third electrode. The presence of a current to the third electrode will, therefore, be an indication of the presence of gas and the size of this current will be an indication of the amount of gas present, and it may be used for finding the pressure exerted by said gas.

The invention will be better understood by reference to the following specification and accompanying drawing, in which the figure shows apparatus attached to a vessel to be evacuated, by means of which apparatus the desired information may be obtained.

Referring to this figure, 4 represents a vessel whose gas pressure is to be measured. A connecting tube 5 extends from this vessel to a vessel 6 in which there are inclosed an electrode 8 serving as an anode and a source of electrons 9. This source of electrons may be of any suitable form, such, for example, as a filament heated by a battery 10. Connected between the elements 8 and 9 is a battery 12, the positive pole of which is connected to the anode 8. Under these circumstances electron current will flow from the cathode 9 to the anode 8.

Adjacent to, and preferably between, the elements 8 and 9 is placed an electrode 13. A battery 14 is connected from the electron source to the element 13. The battery 14 has its negative terminal connected to the member 13 in order that it may be maintained at a potential lower than that of the electron source 9.

If the space within the vessel 6 is a perfect vacuum, the space current between the members 8 and 9 will be a pure electron current, the only source of carriers being the element 9. Inasmuch as the negatively charged electrons from the element 9 can pass only to a member which is at a higher potential, it will be apparent that no current can flow to or from the member 13. If, however, there is present a small amount of gas and the voltage of the battery 12 is sufficiently high, the electrons will acquire sufficient velocity to ionize some of the gas molecules, and there will then be present both negative and positive ions. The positive ions will travel to negatively charged electrodes, and chiefly to that one which is at the lowest potential, that is, to the electrode 13, and in view of the fact that this electrode serves as a collector of positive carriers, it may be spoken of as the collector electrode. The collection of positive charges on the collector member gives rise to a current from this member 13 through the battery 14, and the presence of this current may be detected by the insertion of any suitable galvanometer 16.

It is apparent, of course, that the velocity acquired by the electrons between collisions will depend upon the voltage of the battery 12, and that the higher this voltage the larger the amount of gas ionized, and, therefore, the larger the current flowing through galvanometer 16. In other words, the sensitivity of this indicator can be controlled by the voltage of the battery 12. For any given value of voltage of the battery 12, however, the amount of ionization will be proportional to the amount of gas present if the amount of this gas does not exceed a certain value. Having, therefore, once calibrated this apparatus by any suitable means, it may be used repeatedly for the measurement of pressures within the tube itself, or within any vessel or vessels to which it may be attached, assuming that the attachment is such as to give the same pressure within the tube and the vessels. The readings may be taken while the vessels are being actually evacuated by means of any suitable pump, and they may be taken conveniently and rapidly without in any way affecting the operation of the pump for the measurement consists merely in following the reading of the galvanometer 16.

It has been found that the current through the galvanometer 16 is proportional to the electron or space current flowing from the element 9 to the element 8 and that, therefore, the sensitivity of the gage may be increased by increasing this electron current. The constants of the measuring device will, of course, depend upon the size of the tube itself and upon the dimensions and relative positions of the three electrodes contained therein, as well as upon the characteristics of the circuit external to the vessel, but if these elements are all kept constant the device may be used repeatedly and will give strictly concordant results. The current flowing from 9 to 8 may be read upon any suitable ammeter 17 and may be controlled by changing the voltage of the battery 12 or by means of resistance 18. This vacuum gage has been found to work successfully with pressures somewhat higher than $10^{-3}$ millimeters of mercury to exceedingly minute pressures, the lower limit being determined solely by the sensitivity of the galvanometer 16.

The magnitude of the quantities to be expected may be indicated by the results obtained in one experiment in which an electron current of two milliamperes was used between the cathode and anode, the collector being held at about ten volts negative with respect to the cathode, and the pressure within the tube being about $10^{-3}$ millimeters. The current through the galvanometer 16 was then about two microamperes, i. e., about $2\times10^{-6}$ amperes, and, as the pressure was lowered this current became proportionally less so that at a pressure of $10^{-6}$ millimeters, the current to the collector was about $2\times10^{-9}$ amperes.

The electrodes may have any form or disposition, but in the preferred arrangement in which the electrode 13 is placed between the electrodes 8 and 9, this element should be of such a form that it does not entirely block the electronic current to the anode, that is, it should preferably be of some grid construction, but it is obvious that a very wide latitude of structure is permissible under this restriction. One convenient form which the elements may take is that shown in the figure in which all electrodes are in the form of filaments with both terminals of the filaments coming out of the tube. This permits of a previous heat treatment of the electrodes by means of which occluded gases may be driven off to prevent later disturbances due to these gases when the device is in actual operation. In actual operation, however, the two terminals of anode 8 may be connected and the two terminals of collector 13 may be connected, as shown in the figure.

The apparatus, as described, is adapted for many applications for which other manometers can not be readily used, such, for example, as the measurement of vapor pressure of metals, etc., and for the measurement of pressure changes extending over a long period of time for which more expensive manometers could not be well employed.

What is claimed is:

1. In the measurement of gas pressures, the method which comprises producing a space current the value of which changes in accordance with the pressure of the gas, and in detecting said changes.

2. The method of measuring gas pressures which comprises ionizing the gas, producing a variable current thereby, and measuring said current resulting therefrom.

3. The method of measuring gas pressures which comprises ionizing the gas and measuring the amount of positive ionization.

4. The method of measuring gas pressures within an evacuated space which comprises producing an electron current through said space, giving the electrons sufficient velocity to ionize the gas, and measuring the amount of positive ionization produced thereby.

5. The method of measuring gas pressures within an evacuated space which comprises producing an electron stream within said space, imparting sufficient velocity to said electrons to cause them to ionize the gas, attracting the positive ions thus produced to a collector, and measuring the amount of said positive ions.

6. In the measurement of gas pressures, the method which comprises producing a space current in the gas whose pressure is to be measured whereby said current changes in accordance with said pressure, and in detecting said changes.

7. An apparatus for measuring the pressure within an evacuated vessel comprising a second vessel adapted to be attached to the vessel to be evacuated, three electrodes within said second named vessel, one of said electrodes being an electron source, means for maintaining a second of said electrodes at a positive potential with respect to the first, means for maintaining the third electrode at a negative potential with respect to the first, and a current indicating device in the circuit connecting the first and third electrodes.

8. The method of measuring gas pressures in a vessel wherein the pressure is varied by evacuation which comprises producing a space current the value of which changes in accordance with the pressure of the gas, and in detecting said changes.

9. The method which comprises establishing a normally steady electron current through a gas space, and measuring the change in said current due to the changes in gas pressure.

10. The method which comprises producing a normally steady electron current in a gas space of sufficient value to ionize the gas and measuring the changes in said current due to changes in gas ionization due to pressure variations.

11. An apparatus for measuring gas pressure, comprising an evacuated vessel, means for producing an electron current therein of a normally steady value sufficient to ionize the gas, and means for measuring the change in current due to changes in the ionization with variation of gas pressure.

12. An apparatus for measuring gas pressure comprising an evacuated vessel, a plurality of electrodes within said vessel, means for applying between two of said electrodes an electron current of a normally steady value sufficient to ionize the gas, and means for measuring the change in current due to changes in the ionization with variations in gas pressure.

13. An apparatus for measuring the pressure within an evacuated vessel comprising a second vessel adapted to be attached to the vessel to be evacuated, means for producing an electron stream of sufficient velocity to ionize the gas in said second vessel, means whereby said electron stream is changed in accordance with the amount of positive ionization produced, and means for detecting said changes.

14. The method of measuring gas pressure which comprises establishing a space current through a gas space of sufficient value to ionize the gas therein and energizing an indicating instrument in response to the ions produced, from which the pressure may be deduced.

15. The method of measuring gas pressures which comprises the establishment of a normally steady electron current between two electrodes within a vessel, maintaining a third electrode at a constant potential, and detecting the flow of positive ions through an instrument in circuit with a third electrode from which the amount of gas may be deduced.

16. An apparatus for measuring gas pressures comprising a pair of electrodes within a gas space between which a space current stream is produced, a third constant potential electrode in said stream, and means connected therewith to indicate the amount of current flowing therethrough, due to gas ionization, from which the gas pressure may be deduced.

17. The method of determining gas pressures which involves the establishment of a normal steady electron current between two electrodes within the gas space, maintaining a third electrode at a normal potential, and detecting the variations in space current produced by the change of potential of the third electrode due to gas ionization, from which the gas pressure may be deduced.

In witness whereof, I hereunto subscribe my name this 24th day of November A. D., 1916.

OLIVER E. BUCKLEY.